Patented Apr. 21, 1936

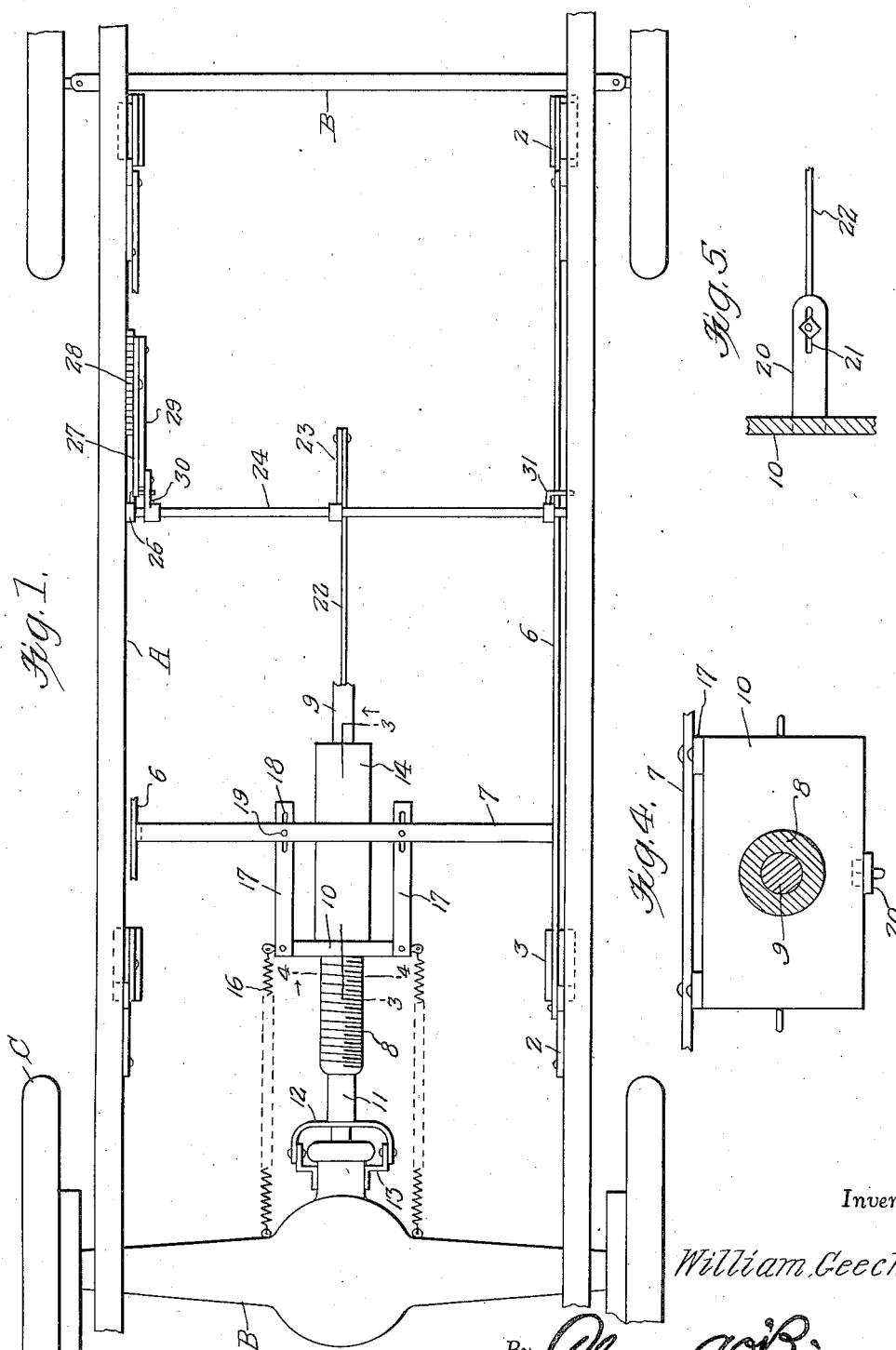

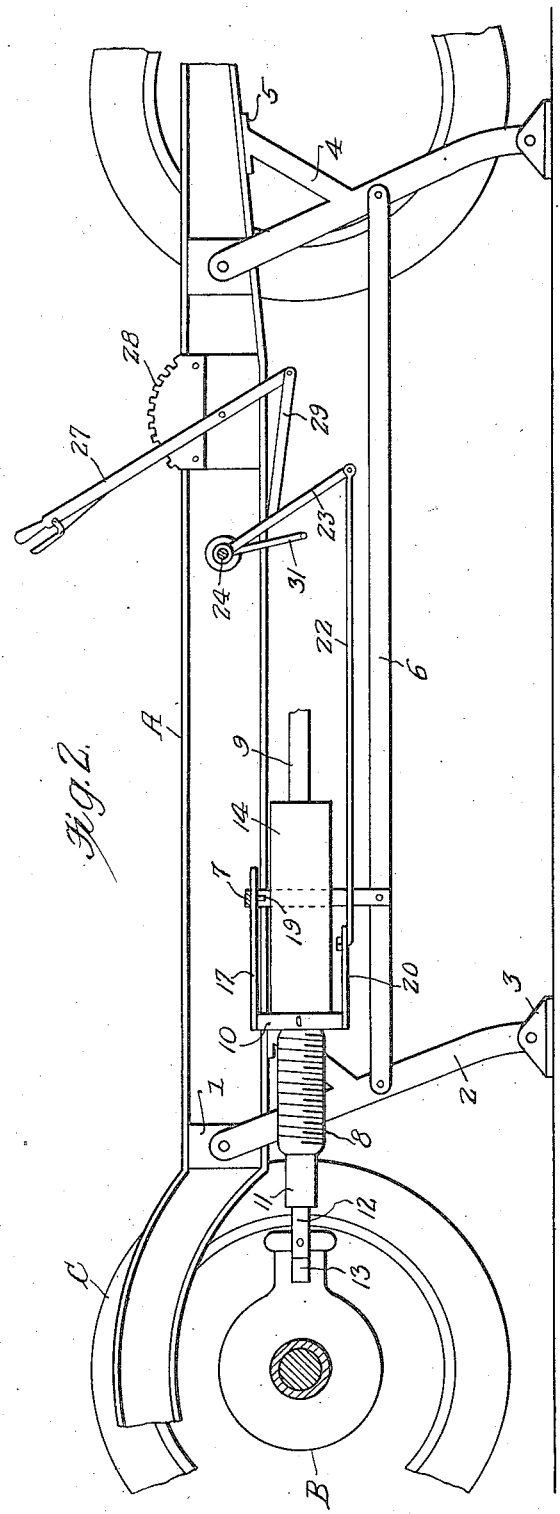

2,038,485

UNITED STATES PATENT OFFICE 2,038,485

JACKING DEVICE FOR MOTOR VEHICLES

William Geeck, New Orleans, La.

Application November 11, 1935, Serial No. 49,325

4 Claims. (Cl. 254—86)

This invention relates to a jacking device for motor vehicles, the general object of the invention being to provide manually controlled means for raising and lowering jacks through means actuated from the drive shaft of the vehicle so that all four wheels of the vehicle can be raised off the road surface whenever desired.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a top plan view of the chassis of a motor vehicle showing the invention applied thereto.

Figure 2 is a longitudinal vertical sectional view through Figure 1 with the jacks in lowered position.

Figure 3 is a section on approximately the line 3—3 of Figure 1.

Figure 4 is a section on the line 4—4 of Figure 1.

Figure 5 is a section on the line 5—5 of Figure 3.

Figure 6 is a detail view showing one end of the transverse shaft journaled in a side member of the chassis frame and also showing the L-shaped rod carried by said end of the shaft.

In these drawings, the letter A indicates the chassis frame mounted by means of the usual spring on the front and rear axles B which carry the wheels C.

In carrying out my invention I attach front and rear pairs of blocks 1 to the side members of the frame and pivot the legs 2 of the jacks to these blocks, each jack having a shoe 3 pivoted to its free end and each jack is provided with a forwardly and upwardly extending part 4 which has a plate 5 secured to the upper end thereof to engage against the under side of the overlying chassis beam, when the jack is in lowered position. The jacks at each side of the vehicle are connected together by a link 6 and the two links are connected together by an inverted U-shaped member 7 which extends transversely of the chassis frame and has the lower ends of its limbs rigidly connected with the links 6.

An externally threaded sleeve 8 is suitably fastened to a part of the drive shaft 9 of the vehicle and the forward end of this sleeve is turned down and provided with a shoulder 8' on which the internally threaded block or nut 10 may ride and idle when at the forward end of the sleeve 8. The rear end of the sleeve is tapered but is not provided with a shoulder. A plain sleeve 11 of less diameter than the sleeve 8 surrounds the rear portion of the shaft 9 and has its front end abutting the rear end of the sleeve 8 and is rotatably arranged on the shaft 9. The rear end of the sleeve 11 is attached to a bracket 12 which is hinged to the brackets 13 attached to the forward part of the differential housing. The nut 10 will rotate on the sleeve 8 when the nut is in its rearward position.

A tube 14 is attached to the front end of the nut 10 and covers the sleeve 8 when the nut is in its most rearward position. The front end of the tube has a dust-tight and water-tight joint 15 with the drive shaft 9.

Springs 16 connect the nut 10 with the differential housing, the springs tending to move the nut rearwardly and arms 17 are connected with the upper edge of the nut and having slots 18 in the front end which receive the pins 19 depending from the bar or U-shaped member 7.

The underside of the nut 10 has the rear end of a forwardly extending bar 20 attached thereto, the front end of which is formed with a slot 21 for receiving the rear end of a rod 22, the front end of the rod being connected to an arm 23 on a transverse shaft 24 journaled in the side members of the chassis frame as shown at 26 in Figure 6. A hand lever 27 is located in any suitable position where it can be reached by the driver of the vehicle, said lever being provided with the usual latch means cooperating with the quadrant 28 and a link 29 connects the lever with an arm 30 on the shaft 24 so that manipulation of the lever 27 will rock the shaft 24. Substantially L-shaped arms 31 are attached to the end portions of the shaft 24 and are adapted to engage the links 6 when the jacks are in raised position and the hand lever is in its most forward position so as to prevent rattling of the parts.

Under normal automobile driving conditions the legs 2 are folded up under the car. The rear legs folding to a position just beneath the rear axle housing. The nut 10 is in its most rearward position riding on the sleeve 11 and held there through the linkage system by the hand lever 27 which is locked, on the quadrant 28, in its most forward position. The arms 31 are bearing against the links 6 and by this tension are holding these members and the legs 2 from vibration and rattle. The springs 16 are holding the nut 10 in tension and thereby preventing rattle of this part.

In order to raise the car the regular automobile transmission is shifted into reverse. Simultaneous with the car starting to move rearward the hand lever 22 is released and moved a short distance in a rearward direction. This movement of the hand lever, acting through the links 29 and 22 and the torque rod 24, moves the nut 10 off of the sleeve 11 and engages it with the threaded sleeve 8 which is rotating. The rotation of the drive shaft 9 and in turn the threaded sleeve 8 causes the nut 10 to travel in a forward direction. The travel of the nut in a forward direction causes a forward movement of the transverse rod 7, the longitudinal links 6 and through them the legs 2. This movement continues until the legs are in their most forward position and the nut has traveled the full length of the threads on the sleeve 8. Throughout this movement the hand lever has slowly moved backward. A slight pull on the hand lever 27 moves it back to a locking position and moves the nut 10 away from the threads on the sleeve 8 unto the shoulder 8'. In this position the entire four wheels of the car are a few inches off of the ground and the automobile motive power is entirely disengaged from the jacking device, thus allowing the running gear of the car to be driven in either direction under power from the automobile engine.

To lower the car the hand lever is unlocked from its rearward position and moved slightly forward simultaneously with connecting the rear wheels of the car, by means of any of the forward shifts of the automobile transmission, with the engine. This release and slight forward movement of the hand lever allows the nut to engage the threads of the sleeve 8 and starts its rearward travel. The rearward movement of the nut moves the transverse bar 7, the longitudinal links 6, and through them rotates the legs 2 all in a rearward direction. Upon completion of the travel of the nut on the threaded sleeve 8 the springs 16 pull the nut away from the threads and onto the sleeve 11 where it is in contact with no revolving part. Throughout the rearward travel of the nut the hand lever has been slowly moving forward. A slight push on the hand lever at this point moves it to a locking position forward and causes the arms 31 to engage the longitudinal links 6 and hold these members and the legs firm against vibration and rattle.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In a jacking system for motor vehicles, jacks pivoted to the chassis frame, a link connecting the jacks at the sides of the frame together, a transverse member connected with the link, a threaded sleeve connected with the drive shaft of the vehicle, a nut for engaging the sleeve, means for connecting the nut to the transverse member, means for normally holding the nut out of engagement with the sleeve and manually operated means for moving the nut into engagement with the sleeve.

2. In a jacking system for motor vehicles, front and rear pairs of jacks pivoted to the chassis frame, a link connecting each pair of jacks at each side of the frame together, a transverse member connected with the links, a threaded sleeve connected with the drive shaft of the vehicle, a nut for engaging the sleeve, means for connecting the nut to the transverse member, spring means for normally holding the nut spaced from the rear end of the sleeve, manually operated means for moving the nut in engagement with the sleeve, a part at the front end of the sleeve on which the nut rests when the shaft is rotated in one direction and which causes the nut to engage the sleeve when the shaft is rotated in an opposite direction.

3. In a jacking system for motor vehicles, a pair of jacks pivoted to each side member of the chassis frame, a link connecting each pair of jacks together, a transverse member connected with the links, a threaded sleeve connected with the drive shaft of the vehicle, a nut for engagement with the sleeve, means for connecting the nut with the transverse member, spring means for normally holding the nut spaced rearwardly from the rear end of the sleeve, manually operated means for moving the nut into engagement with the sleeve, and a tubular member connected with the nut for enclosing the sleeve when the nut is in its rearward position and means at the forward end of the tubular member for providing a dust-tight joint for the drive shaft.

4. A jacking system for a motor vehicle comprising a pair of jacks pivotally connected with each side member of the chassis frame, a link connecting the jacks of each pair together, a transverse member connected with the links, a threaded sleeve connected with the drive shaft of the vehicle, a nut for engaging the sleeve, means for connecting the nut with the transverse member, a transverse shaft journaled in the chassis frame, means for connecting the shaft with the nut, a hand lever, means for connecting the same with the shaft to rotate the shaft, means carried by the shaft for engaging the links when the jacks are in raised position to prevent vibrations of the parts, a plain sleeve through which a part of the drive shaft passes and which has its front end abutting the rear end of the first sleeve, spring means for normally holding the nut on the plain sleeve, and a reduced shoulder forming part at the front end of the threaded sleeve.

WILLIAM GEECK.